US 7,564,354 B2

(12) United States Patent
Eren et al.

(10) Patent No.: US 7,564,354 B2
(45) Date of Patent: Jul. 21, 2009

(54) MONITORING DEVICE FOR DETECTING OPENING OF PACKAGING

(75) Inventors: Selcuk Suat Eren, Chapel Hill, NC (US); Brian Jules Jaeger, Chapel Hill, NC (US); Douglas Alan Law, Chapel Hill, NC (US); Paul Allen Roberts, Raleigh, NC (US); Shawn Konrad Sremaniak, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 11/320,931

(22) Filed: Dec. 29, 2005

(65) Prior Publication Data
US 2007/0152822 A1     Jul. 5, 2007

(51) Int. Cl.
*G08B 13/14*     (2006.01)
(52) U.S. Cl. .................. 340/572.1; 340/571; 340/572.4; 340/572.7; 340/572.8; 340/568.1
(58) Field of Classification Search ................. 340/571, 340/572, 572.4, 572.7, 572.8, 568.1
See application file for complete search history.

(56) References Cited
U.S. PATENT DOCUMENTS

| | | | | |
|---|---|---|---|---|
| 5,517,195 A | | 5/1996 | Narlow et al. ................. 342/51 |
| 5,574,431 A | | 11/1996 | McKeown et al. .......... 340/572 |
| 5,884,425 A | * | 3/1999 | Baldwin ....................... 40/638 |
| 6,050,622 A | * | 4/2000 | Gustafson ............... 292/307 R |
| 6,091,607 A | | 7/2000 | McKeown et al. .......... 361/777 |
| 6,518,887 B2 | | 2/2003 | Suzuki et al. ............. 340/572.8 |
| 6,750,770 B2 | | 6/2004 | Spiess et al. ............. 340/572.3 |
| 6,794,000 B2 | * | 9/2004 | Adams et al. .............. 428/40.1 |
| 6,888,509 B2 | | 5/2005 | Atherton ..................... 343/718 |
| 6,894,615 B2 | | 5/2005 | Look ....................... 340/572.1 |
| 7,049,962 B2 | * | 5/2006 | Atherton et al. .......... 340/572.1 |
| 7,098,794 B2 | * | 8/2006 | Lindsay et al. ........... 340/572.3 |
| 7,102,522 B2 | * | 9/2006 | Kuhns ..................... 340/572.7 |
| 2002/0036237 A1 | * | 3/2002 | Atherton et al. ............. 235/492 |
| 2002/0067264 A1 | | 6/2002 | Soehnlen ................. 340/572.1 |
| 2005/0116826 A1 | | 6/2005 | Wetsebrger ............... 340/572.3 |
| 2005/0127155 A1 | | 6/2005 | Claessens et al. ........... 235/375 |
| 2005/0127157 A1 | | 6/2005 | Stemmle et al. ............. 235/377 |
| 2006/0016897 A1 | * | 1/2006 | Yasuda et al. ............... 235/492 |

\* cited by examiner

*Primary Examiner*—Daniel Wu
*Assistant Examiner*—Son M Tang
(74) *Attorney, Agent, or Firm*—Yee & Associates, P.C.; Steven L. Bennett

(57) ABSTRACT

An apparatus and method are disclosed for detecting whether a device has been opened. A first radio frequency identification (RFID) tag is installed in the package, typically during manufacturing. A first component is included in the first RFID tag. The first component modifies a power source to the first RFID tag in response to the package being opened after the first RFID tag is installed. The first RFID tag indicates a first event in response to the power supply being modified.

4 Claims, 7 Drawing Sheets

MONITORING DEVICE FOR DETECTING OPENING OF PACKAGING

BACKGROUND OF THE INVENTION

1. Field of the Invention

The present invention relates generally to monitoring devices for determining whether a package has been opened. Still more particularly, the present invention is a method and apparatus for determining whether a particular package has been opened after a monitoring device was installed in the package.

2. Description of the Related Art

Theft of products is a major problem facing retailers. Theft is an especially significant problem with digital media products, such as computer software, DVDs, music CDs, and video games, because these products can be very expensive. The storage medium used to store the digital content of these products is often very compact, making it easy to steal.

Digital media is stored in a package. The size of this package varies. In order to discourage theft of the media, in some instances, manufacturers have begun to enlarge the package so that it is more difficult to conceal. In response to this, instead of taking the entire package that includes the digital media, thieves open the package, remove the digital media from the package, and take just the media itself typically leaving the package in the store. The removal of the media from the package is typically done in the store itself before the thief leaves the store.

Known solutions attach some type of security device to the package itself and not to the digital media. Some type of security detection device is typically provided at the entrance to the store to detect whether the security device has passed through the security detection device. By opening the package and removing the digital media from its package where the package includes the security device, a thief is able to take the media without being detected. No security device is attached to the media.

BRIEF SUMMARY OF THE INVENTION

An apparatus and method are disclosed for detecting whether a device has been opened. A radio frequency identification (RFID) tag is installed in the package, typically during manufacturing. A component is included in the RFID tag. The component modifies a power source to the RFID tag in response to the package being opened after the RFID tag is installed. The RFID tag indicates an event in response to the power supply being modified.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
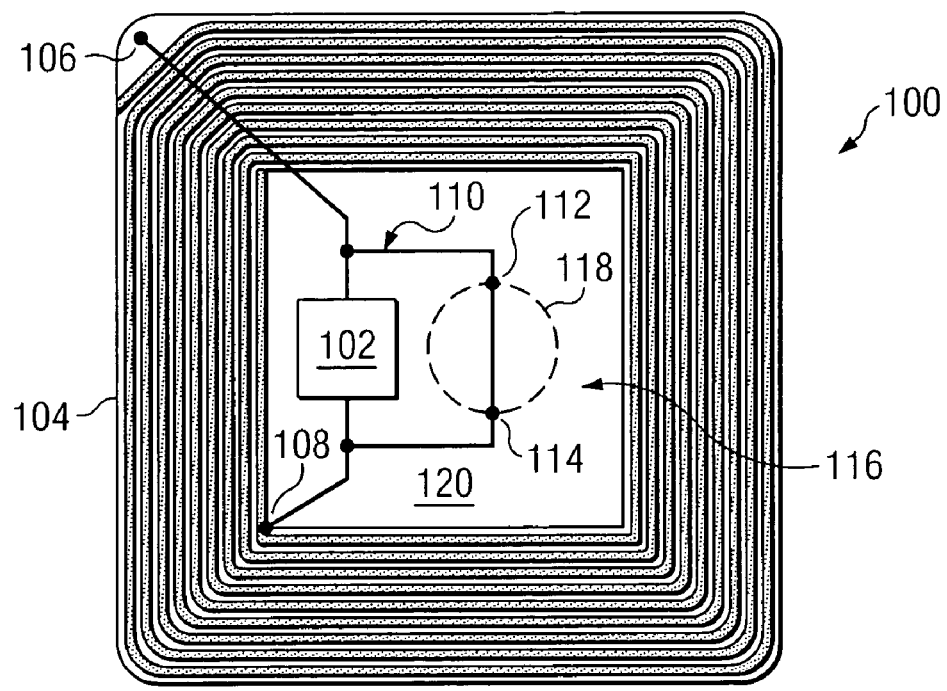
FIG. 1 depicts a radio frequency identification (RFID) tag 100 that includes a monitoring device in accordance with an illustrative embodiment of the present invention.

The illustrative embodiment of the present invention is an apparatus and method for detecting whether a package has been opened. The illustrative embodiment uses one or more modified radio frequency identification (RFID) tags that are installed within the package during manufacturing. The modified RFID tag indicates whether the package has been opened since the manufacturing process was completed by indicating an alert. The physical act of opening the package causes the RFID tag to indicate an alert that the package has been opened. In addition, the modified RFID tag is associated with a particular package and can indicate which particular package has been opened.

RFID readers broadcast interrogation signals that are received within a particular geographical range. An RFID tag that is capable of receiving and processing an interrogation signal then responds to the signal by transmitting the RFID tag's unique RFID identifier back to the RFID reader. The unique RFID identifier is assigned to the particular RFID tag to uniquely identify that RFID tag.

An RFID tag includes a microchip. The microchip is the logic within the RFID tag that processes and responds to interrogation signals. The microchip is responsible for transmitting the RFID tag's RFID identifier in response to interrogation signals that the RFID tag receives.

A first embodiment is a monitoring device, referred to herein as an "inactive" monitoring device, that is an RFID tag that is disabled until the package is opened. Before the package is opened, the RFID tag will not respond to interrogation signals that are transmitted by an RFID reader, i.e. the RFID tag will not transmit its unique RFID identifier in response to the interrogation signals. Once the package is opened, the RFID tag will begin transmitting its unique RFID identifier in response to interrogation signals that the RFID tag receives from an RFID reader.

A second embodiment is a monitoring device that is an RFID tag that is enabled until the package is open, referred to herein as an "active" monitoring device. Before the package is opened, the RFID tag will respond to interrogation signals that are transmitted by an RFID reader by transmitting its unique RFID identifier back to the RFID reader. Once the package is opened, the RFID tag will no longer transmit its unique RFID identifier in response to interrogation signals that the RFID tag receives from an RFID reader.

A third embodiment is a monitoring device that includes an active monitoring device and an inactive monitoring device. The active and inactive monitoring devices operate together such that the one monitoring device is transmitting its RFID identifier while the other monitoring device is not. In this manner, the third embodiment monitoring device is transmitting just one RFID identifier in response to interrogation signals it receives from an RFID reader.

In this third embodiment, before the package is opened, the active monitoring device will respond to interrogation signals that are transmitted by an RFID reader by transmitting its unique RFID identifier back to the RFID reader, and the inactive monitoring device will not respond to interrogation signals. Once the package is opened, the active monitoring device will no longer transmit its unique RFID identifier in response to interrogation signals that the RFID tag receives from an RFID reader. Once the package is opened, the inactive monitoring device begins transmitting its unique RFID identifier in response to interrogation signals that the RFID tag receives from an RFID reader.

The third embodiment monitoring device transmits a first RFID identifier if the package has not been opened. After the package has been opened, the third embodiment monitoring device stops transmitting the first RFID identifier and begins transmitting a second RFID identifier. In this manner, the third embodiment monitoring device transmits a first RFID identifier if the package has not been opened and a second RFID identifier if the package has been opened.

In all embodiments, it is the physical act of opening the package that causes the monitoring device to indicate an alert. In the first embodiment, the alert is the transmission of an RFID identifier. In the second embodiment, the alert is the absence of a transmission of an RFID identifier. In the third embodiment, the alert is the change in the transmission from a first RFID identifier to a second RFID identifier.

The illustrative embodiment is preferably implemented utilizing passive RFID tags. The microchip in passive RFID tags receives power through the RFID tag's antenna from the interrogation signal the RFID tag received from the RFID reader. If the passive RFID tag cannot receive a signal through its antenna, the passive RFID tag cannot transmit radio frequency (RF) signals.

FIG. 1 depicts a radio frequency identification (RFID) tag 100 that includes a monitoring device in accordance with an illustrative embodiment of the present invention.

RFID tag 100 includes a microchip 102 that is attached to an antenna 104. The RFID tag's unique identifier is stored in microchip 102. Microchip 102 is an integrated circuit that includes the logic of RFID tag 100. Microchip 102 is coupled between antenna 104 as depicted at first antenna connection 106 and second antenna connection 108.

RFID tag 100 is described herein as an "inactive" type of monitoring device because it is inactive until the package is opened. RFID tag 200 does not transmit its RFID identifier until the package in which it is stored is opened.

RFID tag 100 includes a removable disabler wire 110 that provides a short circuit that removes microchip 102 from antenna 104. Disabler wire 110 is a "component". Disabler wire 110 is connected at connections 112 and 114 in order to short-circuit microchip 102. Because microchip 102 has been short-circuited, microchip 102 will not receive signals from antenna 104, and therefore will not receive power. When microchip 102 is short-circuited, it will not respond to signals received detected by antenna 104. Because microchip 102 will not respond to signals detected by antenna 104, microchip 102 will not respond to any signals that are transmitted by an RFID reader and will not transmit an RFID identifier.

RFID tag 100 also includes a back 116. A tear-away section 118 is provided within back 116. Tear-away section 118 is perforated so that it can be easily torn completely out of back 116. Disabler wire 110 is attached to tear-away section 118 such that when tear-away section 118 is removed from back 116, disabler wire 110 is removed from connections 112, 114. When disabler wire 110 is removed from connections 112, 114, microchip 102 is no longer short-circuited and will now receive power. When microchip 102 is no longer short-circuited, microchip 102 will respond to signals it receives from a reader by transmitting its RFID identifier.

Prior to tear-away section 118 being removed from back 116, RFID tag 100 will not respond to any interrogation signal antenna 104 might detect. After tear-away section 118 has been removed from back 116, RFID tag 100 will respond to interrogation signals antenna 104 receives from an RFID reader. In this manner, RFID tag 100 is disabled until tear-away section 118 has been removed from back 116. Removing tear-away section 118 from back 116 enables RFID tag 100.

Figure 2:
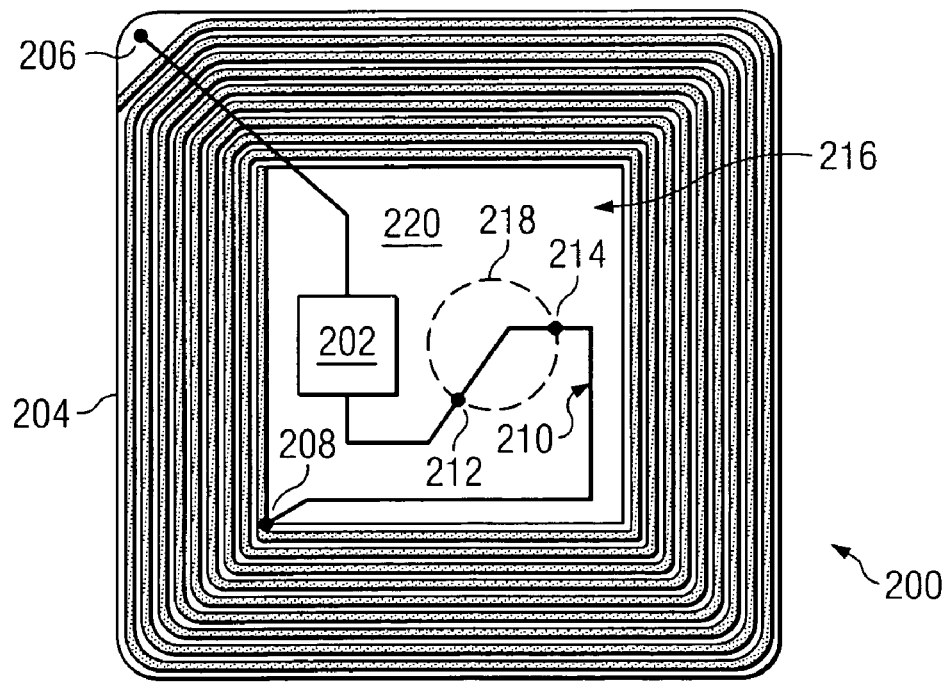
FIG. 2 depicts a radio frequency identification (RFID) tag 200 that includes a monitoring device in accordance with an illustrative embodiment of the present invention.

FIG. 2 depicts a radio frequency identification (RFID) tag 200 that includes a monitoring device in accordance with an illustrative embodiment of the present invention.

RFID tag 200 is described herein as an "active" type of monitoring device because it is active until the package is opened. RFID tag 200 transmits its RFID identifier until the package in which it is stored is opened.

RFID tag 200 includes a microchip 202 that is attached to an antenna 204. The RFID tag's unique identifier is stored in microchip 202. Microchip 202 is the integrated circuit of RFID tag 200. Microchip 202 is coupled between antenna 204 depicted at first antenna connection 206 and second antenna connection 208. RFID tag 200 includes a wire 210 that connects microchip 202 to second antenna connection 208.

RFID tag 200 includes a back 216. A tear-away section 218 is provided within back 216. Tear-away section 218 is perforated so that it can be easily torn completely out of back 216. Wire 210 is attached to tear-away section 218 such that when tear-away section 218 is removed from back 216, a portion of wire 210, from connection 212 to connection 214, is removed. The portion of wire 210, from connection 212 to connection 214, is a "component". When the portion of wire 210 is removed, microchip 202 will no longer be able to receive power from antenna 204. When microchip 202 is no longer able to receive power, microchip 202 will no longer be able to respond to interrogation signals that are sent from an RFID reader and will not transmit its RFID identifier.

Prior to tear-away section 218 being removed from back 216, RFID tag 200 will respond to any interrogation signal antenna 204 receives from an RFID reader. After tear-away section 218 has been removed from back 216, RFID tag 200 will no longer respond to any interrogation signal antenna 204 receives from an RFID reader. In this manner, RFID tag 200 is enabled until tear-away section 218 has been removed from back 216. Removing tear-away section 218 from back 216 disables RFID tag 200.

Figure 3:
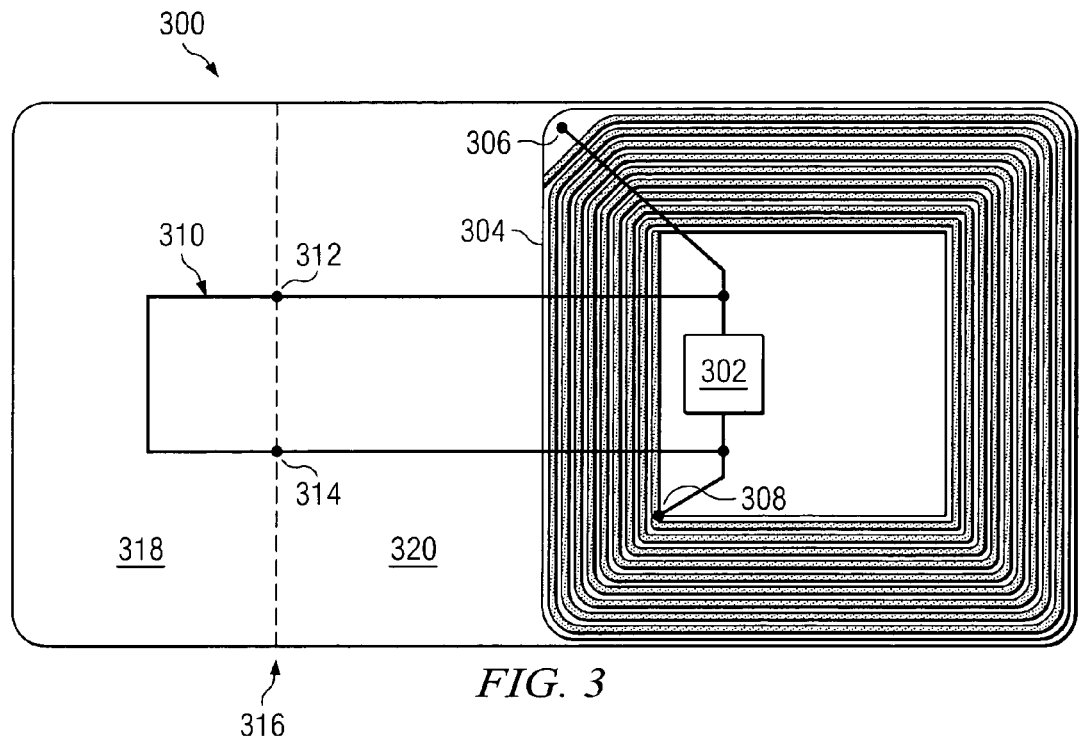
FIG. 3 depicts a radio frequency identification (RFID) tag 300 that includes a monitoring device in accordance with an illustrative embodiment of the present invention.

FIG. 3 depicts a radio frequency identification (RFID) tag 300 that includes a monitoring device in accordance with an illustrative embodiment of the present invention.

RFID tag 300 is described herein as an "inactive" type of monitoring device because it is inactive until the package is opened. RFID tag 300 does not transmit its RFID identifier until the package in which it is stored is opened.

RFID tag 300 includes a microchip 302 that is attached to an antenna 304. The RFID tag's unique identifier is stored in microchip 302. Microchip 302 is the integrated circuit of RFID tag 300. Microchip 302 is coupled between antenna 304 as depicted at first antenna connection 306 and second antenna connection 308.

RFID tag 300 includes a removable disabler wire 310 that provides a short circuit that removes microchip 302 from antenna 306. Disabler wire 310 is a "component". Disabler wire 310 is connected at connections 312 and 314 in order to short-circuit microchip 302. Because microchip 302 has been short-circuited, microchip 302 will not receive power and will not respond to any signals received by antenna 304. Because microchip 302 will not respond to signals received by antenna 304, microchip 302 will not respond to any signals that are transmitted by an RFID reader and will not transmit its RFID identifier.

RFID tag 300 also includes a back 316. Back 316 includes a tear-away section 318 and a remaining back section 320. Tear-away section 318 is perforated so that it can be easily torn completely off of remaining back section 320. Disabler wire 310 is attached to tear-away section 318 such that when tear-away section 318 is removed from remaining back section 320, disabler wire 310 is removed from connections 312, 314. When disabler wire 310 is removed from connections 312, 314, microchip 302 is no longer short-circuited and will now receive power. When microchip 302 is no longer short circuited, microchip 302 will respond to signals it receives from a reader by transmitting its RFID identifier.

Prior to tear-away section 318 being removed from remaining back section 320, RFID tag 300 will not respond to any interrogation signal antenna 304 receives from an RFID reader. After tear-away section 318 has been removed from remaining back section 320, RFID tag 300 will respond to interrogation signals antenna 304 receives from an RFID reader. In this manner, RFID tag 300 is disabled until tear-away section 318 has been removed from remaining back section 320. Removing tear-away section 318 from remaining back section 320 enables RFID tag 300 so that it can respond to interrogation signals by transmitting its RFID identifier.

Figure 4:
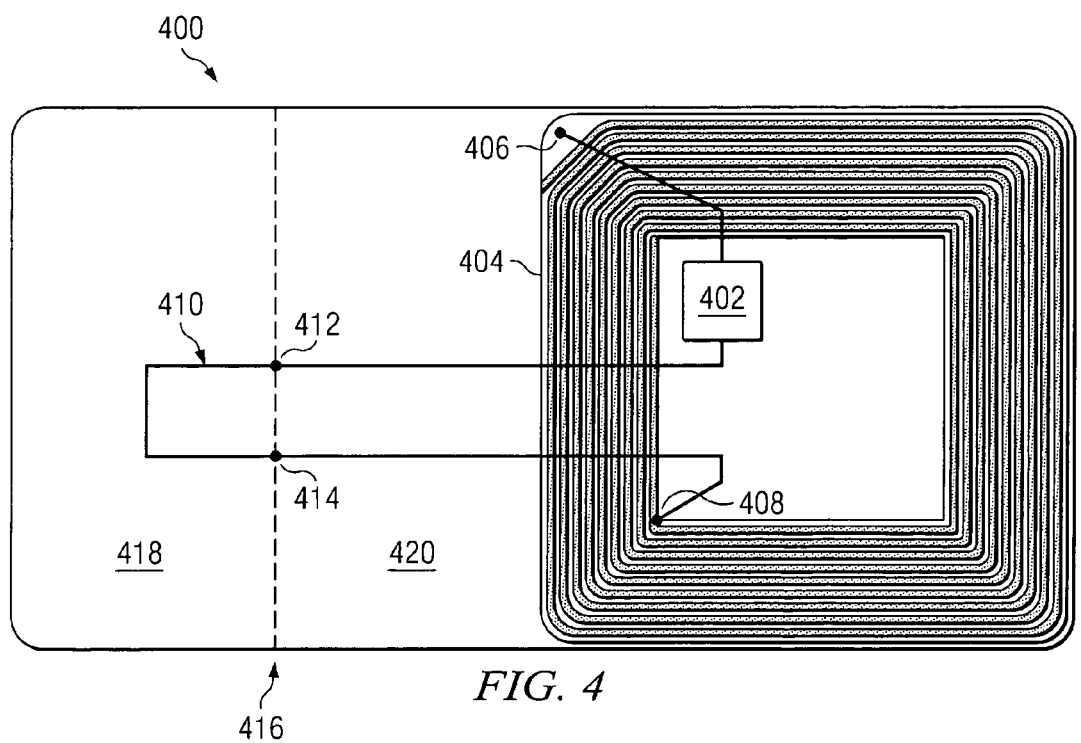
FIG. 4 depicts a radio frequency identification (RFID) tag 400 that includes a monitoring device in accordance with an illustrative embodiment of the present invention.

FIG. 4 depicts a radio frequency identification (RFID) tag 400 that includes a monitoring device in accordance with an illustrative embodiment of the present invention.

RFID tag 400 is described herein as an "active" type of monitoring device because it is active until the package is opened. RFID tag 400 transmits its RFID identifier until the package in which it is stored is opened.

RFID tag 400 includes a microchip 402 that is attached to an antenna 404. The RFID tag's unique identifier is stored in microchip 402. Microchip 402 is the integrated circuit of RFID tag 400. Microchip 402 is coupled between antenna 404 as depicted at first antenna connection 406 and second antenna connection 408. RFID tag 400 includes a wire 410 that connects microchip 402 to second antenna connection 408.

RFID tag 400 includes a back 416. Back 416 includes a tear-away section 418 and a remaining back section 420. Tear-away section 418 is perforated so that it can be easily torn completely off of remaining back section 420. Wire 410 is attached to tear-away section 418 such that when tear-away section 418 is torn off of remaining back section 420, a portion of wire 410, from connection 412 to connection 414, is removed. The portion of wire 410 from connection 412 to connection 414 is a "component". When the portion of wire 410 is removed, microchip 402 will no longer be able to receive power from antenna 404. When microchip 402 is no longer able to receive power, microchip 402 will no longer be able to respond to interrogation signals that are received by antenna 404. Therefore, microchip 402 will not respond to any signal sent from an RFID reader and will not transmit its RFID identifier.

Prior to tear-away section 418 being removed from remaining back section 420, RFID tag 400 will respond to any interrogation signal antenna 404 receives from an RFID reader by transmitting its RFID identifier. After tear-away section 418 has been removed from remaining back section 420, RFID tag 400 will no longer respond to any interrogation signal antenna 404 receives from an RFID reader and will not transmit its RFID identifier. In this manner, RFID tag 400 is enabled until tear-away section 418 has been removed from remaining back section 420. Removing tear-away section 418 from remaining back section 420 disables RFID tag 400.

Figure 5A:
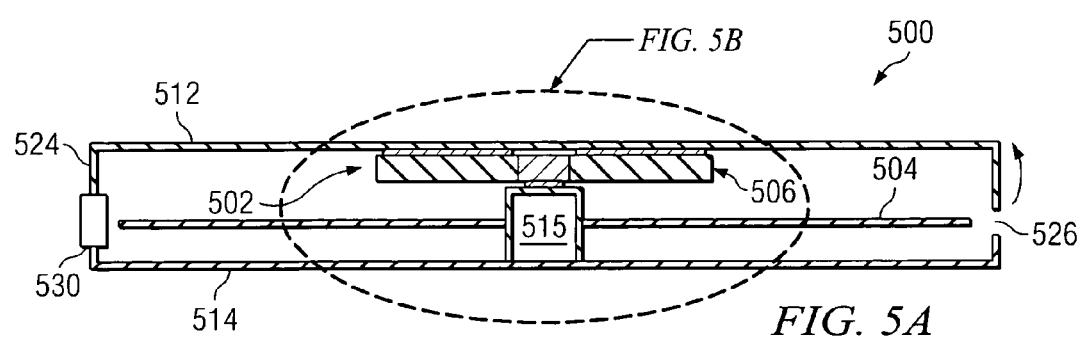
FIG. 5A is a side view of a package 500 that includes an RFID tag that includes a monitoring device 502 in accordance with an illustrative embodiment of the present invention.
Figure 5B:
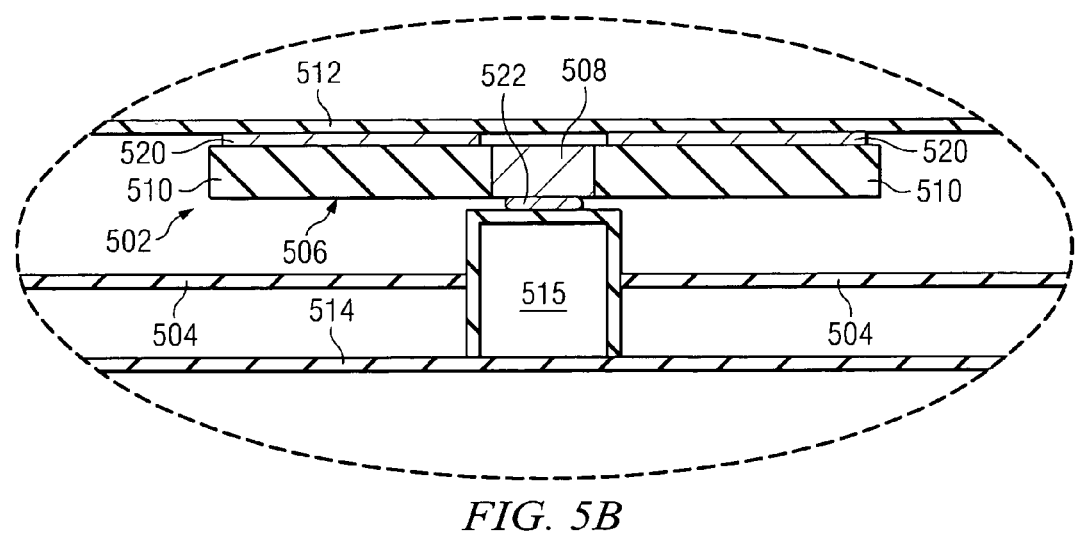
FIG. 5B is a sectional view of section A of FIG. 5a in accordance with an illustrative embodiment of the present invention.

FIG. 5A is a side view of a package 500 that includes an RFID tag that includes a monitoring device 502 in accordance with an illustrative embodiment of the present invention. FIG. 5B is a sectional view of section A of FIG. 5A in accordance with an illustrative embodiment of the present invention.

A digital storage medium 504 is included within package 500. During the manufacturing process, monitoring device 502 is installed in package 500. Monitoring device 502 includes a back 506. Back 506 includes a tear-away portion 508 and a remaining back portion 510. After monitoring device 500 is installed during the manufacturing process and before package 500 is ever opened, tear-away portion 508 remains connected to back 506 as depicted in FIG. 5B.

Remaining back portion 510 is secured only to a top 512 of package 500 utilizing an adhesive layer 520. Tear-away portion 508 is secured to only bottom 514 utilizing an adhesive layer 522. In the depicted example, tear-away portion 508 is secured to a spindle 515 that is part of bottom 514. Thus, when top 512 is moved, remaining back portion 510 moves with top 512. When bottom 514 is moved, tear-away portion 508 moves with bottom 514.

In the depicted example, package 500 includes a hinged end 524 and an opening end 526. Opening end 526 is capable of separating to permit top 512 to swing away from bottom 514 and pivot about hinged end 524 utilizing hinge 530. When package 500 is opened, top 512 is moved away from bottom 514 by separating opening end 526. Because remaining back portion 510 remains secured to top 512 and tear-away portion 508 remains secured to bottom 514 when package 500 is opened, tear-away portion 508 is torn completely out of back 516.

If RFID tag 100, depicted in FIG. 1, is used to implement monitoring device 502, monitoring device 502 will be disabled until package 500 is opened, i.e. as long as package 500 remains closed, monitoring device 502 will not respond to signals it receives from an RFID reader. Monitoring device 502 will not transmit its RFID identifier as long as package 500 has not been opened. If package 500 is opened, tear-away portion 118 is removed from back 116. When tear-away portion 118 is removed from back 116, disabler wire 110 is removed from connections 112, 114, thus removing the short circuit from microchip 102. Microchip 102 is then able to function. At this time, RFID tag 100 will respond to interrogation signals it receives from an RFID reader and will transmit its RFID identifier.

If RFID tag 200, depicted in FIG. 2, is used to implement monitoring device 502, monitoring device 502 will be enabled until package 500 is opened, i.e. as long as package 500 remains closed, monitoring device 502 will respond to signals it receives from an RFID reader by transmitting its RFID identifier. Monitoring device 502 will transmit its RFID identifier as long as package 500 has not been opened. If package 500 is opened, tear-away portion 218 is removed from back 216. When tear-away portion 218 is removed from back 216, the section of wire 210 from connection 212 to 214 is removed, thus removing microchip 202 from the circuit by removing power from microchip 202. Microchip 202 is then no longer able to function. At this time, RFID tag 200 will not respond to interrogation signals it receives from an RFID reader and will no longer transmit its RFID identifier.

Figure 6A:
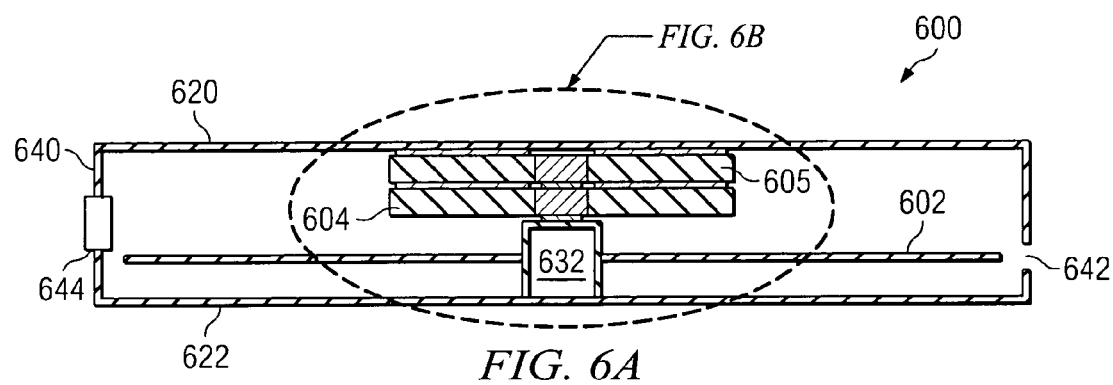
FIG. 6A is a side view of a package 600 that includes multiple RFID tags where each RFID tag includes a monitoring device in accordance with an illustrative embodiment of the present invention.
Figure 6B:
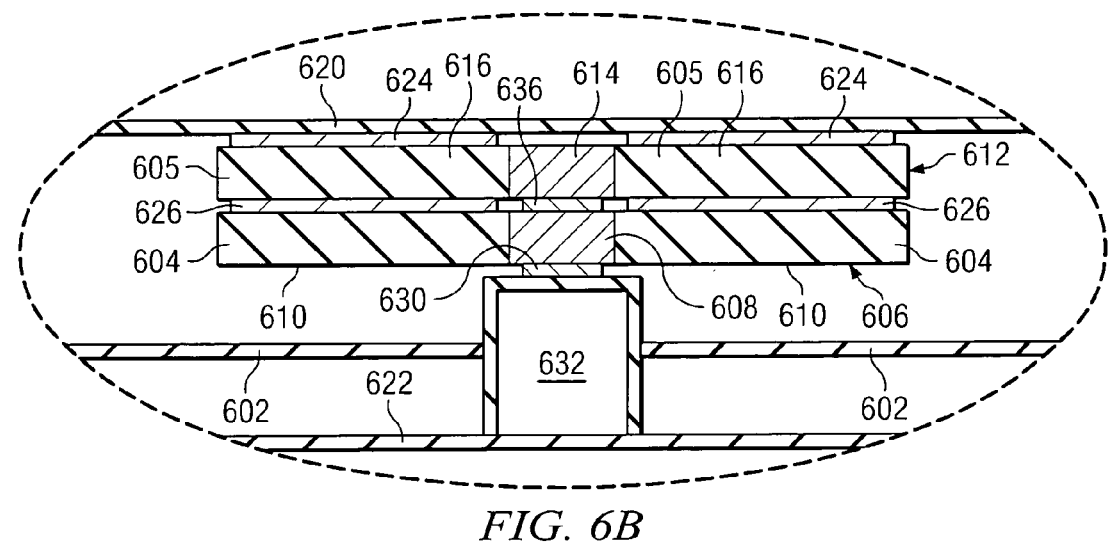
FIG. 6B is a sectional view of section A of FIG. 6a in accordance with an illustrative embodiment of the present invention.

FIG. 6A is a side view of a package 600 that includes multiple RFID tags that each includes a monitoring device in accordance with an illustrative embodiment of the present invention. FIG. 6B is a sectional view of section A of FIG. 6A in accordance with an illustrative embodiment of the present invention.

A product, such as a digital storage medium 602, is included within package 600. During the manufacturing process, multiple monitoring devices, e.g. monitoring devices 604 and 605, are installed in package 600. Monitoring device 604 includes a back 606. Back 606 includes a tear-away portion 608 and a remaining back portion 610. Monitoring device 605 includes a back 612. Back 612 includes a tear-away portion 614 and a remaining back portion 616.

After monitoring devices 604 and 605 are installed during the manufacturing process and before package 600 is ever opened, tear-away portion 608 remains connected to back 606 and tear-away portion 614 remains connected to back 612, as depicted in FIG. 6B.

Monitoring devices 604 and 605 are sandwiched together between a top 620 and a bottom 622 of package 600. Remaining back portion 616 is secured only to top 620 of package 600 utilizing an adhesive layer 624. Remaining back portion 610 is secured only to remaining back portion 616 utilizing an adhesive layer 626. In this manner, remaining back portions 610 and 616 operate together as one single unit. Thus, when top 620 is moved, both remaining back portions 610 and 616 move together with top 620.

Tear-away portion 608 is secured to only bottom 622 utilizing an adhesive layer 630. In the depicted example, tear-away portion 608 is secured to a spindle 632 that is part of bottom 622. Tear-away portion 614 is secured to only tear-away portion 608 utilizing an adhesive layer 636. In this manner, tear-away portions 608 and 614 operate together as one single unit. Thus, when bottom 622 is moved, both tear-away portions 608 and 614 move together with bottom 622.

In the depicted example, package 600 includes a hinged end 640 and an opening end 642. Opening end 642 is capable of separating to permit top 620 to swing away from bottom 622 and pivot about hinged end 640 utilizing hinge 644. When package 600 is opened, top 620 is moved away from bottom 622 by separating opening end 642. Remaining back portion 616 remains secured to top 620 and remaining back portion 610 remains secured to remaining back portion 616 when package 600 is opened.

Tear-away portion 608 remains secured to bottom 622 and tear-away portion 614 remains secured to tear-away portion 608 when package 600 is opened. When package 600 is opened, tear-away portion 608 is torn completely out of back 606 and tear-away portion 614 is torn completely out of back 612.

Package 600 includes one inactive type of monitoring device and one active type of monitoring device. For example, if monitoring device 604 is an inactive monitoring device then monitoring device 605 is an active monitoring device. RFID tag 100 can be used to implement either monitoring device 604 or 605 while RFID tag 200 is used to implement the other monitoring device.

Alternatively, RFID tag 300 can be used to implement either monitoring device 604 or 605 while RFID tag 400 is used to implement the other monitoring device.

Figure 7:
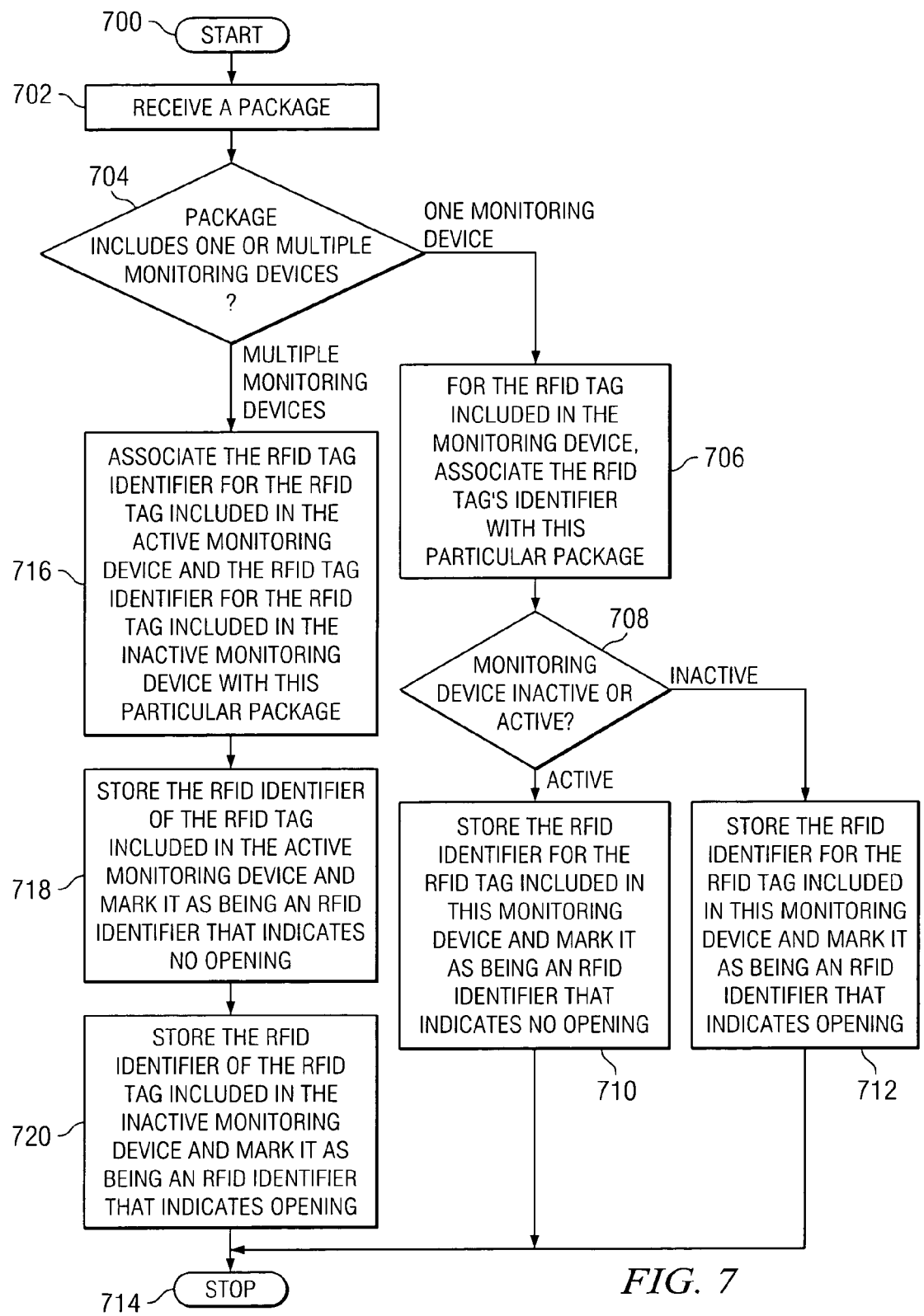
FIG. 7 depicts a high level flow chart that illustrates associating RFID tag identifiers with a particular package in order to indicate whether the package has been opened in accordance with an illustrative embodiment of the present invention.

FIG. 7 depicts a high level flow chart that illustrates associating RFID tag identifiers with a particular package in order to indicate whether opening of the package has occurred in accordance with an illustrative embodiment of the present invention. The process starts as depicted by block 700 and thereafter passes to block 702 which illustrates receiving a particular package. Next, block 704 depicts a determination of whether or not the package includes one or multiple monitoring devices. If a determination is made that the package includes one monitoring device, implemented as one RFID tag, the process passes to block 706 which depicts, for the RFID tag that is included in the monitoring device, associating the RFID tag's identifier with this particular package.

The process then passes to block 708 which illustrates a determination of whether or not the monitoring device is an active monitoring device or an inactive monitoring device. If a determination is made that the monitoring device is an active monitoring device, the process passes to block 710 which depicts storing the RFID identifier for the RFID tag included in the monitoring device and marking it as being an RFID identifier that indicates no opening. The process then terminates as illustrated by block 714.

Referring again to block 708, if a determination is made that the monitoring device is inactive, the process passes to block 712 which depicts storing the RFID identifier for the RFID tag included in the monitoring device and marking it as being an RFID identifier that indicates opening. The process then terminates as illustrated by block 714.

Referring again to block 704, if a determination is made that the package includes multiple monitoring devices, implemented as RFID tags, the process passes to block 716 which illustrates associating the RFID tag identifier for the RFID tag that is included in the active monitoring device and the RFID tag identifier for the RFID tag included in the inactive monitoring device with this particular package. Next, block 718 depicts storing the RFID identifier of the RFID tag included in the active monitoring device and marking it as being an RFID identifier that indicates no opening. Thereafter, block 720 illustrates storing the RFID identifier for the RFID tag included in the inactive monitoring device and marking it as being an RFID identifier that indicates opening. The process then terminates as depicted by block 714.

Figure 8:
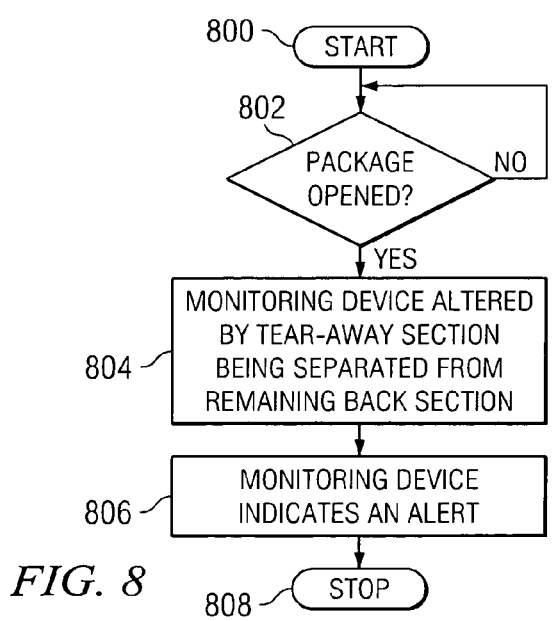
FIG. 8 depicts a high level flow chart that illustrates a monitoring device indicating that the package that includes the monitoring device has been opened in accordance with the illustrative embodiment of the present invention.

FIG. 8 depicts a high level flow chart that illustrates a monitoring device indicating an alert in accordance with the illustrative embodiment of the present invention. The process starts as depicted by block 800 and thereafter passes to block 802 which illustrates a determination of whether or not the package has been opened. If a determination is made that the package has not been opened, the process passes back to block 802. If a determination is made that the package has been opened, the process passes to block 804 which depicts the monitoring device being altered. The physical act of opening the package alters the monitoring device by separating the tear-away section from the remaining back section.

Next, block 806 illustrates the monitoring device indicating an alert. If the monitoring device is an inactive monitoring device, the RFID tag in the monitoring device will begin transmitting its RFID identifier. In this case the alert is the transmission of the RFID identifier.

If the monitoring device is an active monitoring device, the RFID tag in the monitoring device will stop transmitting its RFID identifier. In this case, the alert is the absence of the transmission of the RFID identifier.

If the monitoring device includes a combination of an active monitoring device and an inactive monitoring device, the alert is the change from the transmission of the RFID identifier of the active monitoring device to the transmission of the RFID identifier of the inactive monitoring device.

The process then terminates as depicted by block 808.

Figure 9:
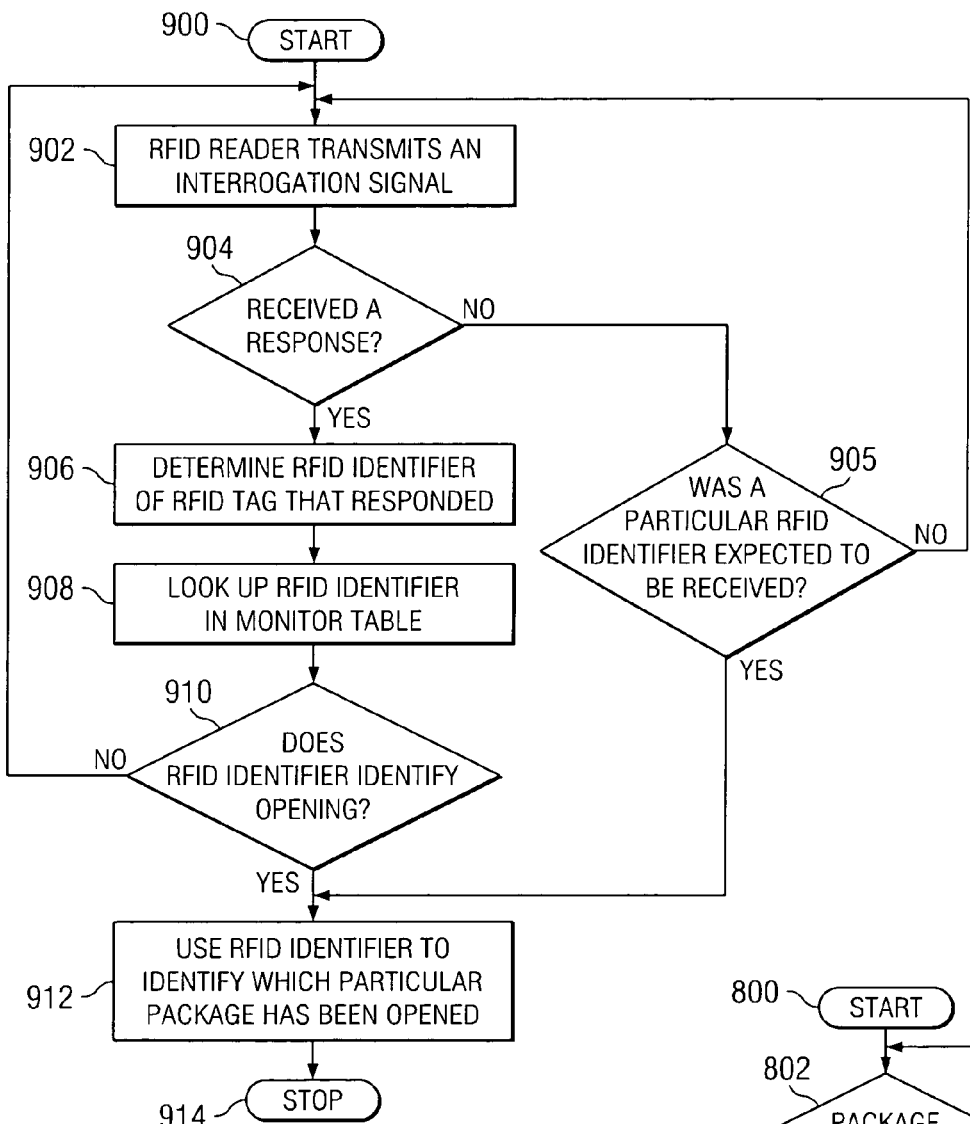
FIG. 9 illustrates a high level flow chart that depicts determining whether a particular package has been opened in accordance with the illustrative embodiment of the present invention.

FIG. 9 illustrates a high level flow chart that depicts determining whether a package has been opened in accordance with the illustrative embodiment of the present invention. The process starts as depicted by block 900 and thereafter passes to block 902 which illustrates an RFID reader transmitting an interrogation signal. Next, block 904 depicts a determination of whether or not the RFID reader has received a response to its interrogation signal. If a determination is made that the RFID reader has not received a response to its interrogation signal, the process passes to block 905 which depicts a determination of whether or not a particular response including a particular RFID identifier was expected. If a determination is made that a particular RFID identifier was not expected, the process passes back to block 902. Referring again to block 905, if a determination is made that a response including a particular RFID identifier was expected, the process passes to block 912.

Referring again to block 904, if a determination is made that the RFID reader has received a response to its interrogation signal, the process passes to block 906 which illustrates determining the RFID identifier of the RFID tag that responded. When an RFID tag responds to an interrogation signal, the RFID tag will include its RFID identifier in the response signal. Thereafter, block 908 depicts looking up the RFID identifier in a monitor table included in the RFID reader. The monitor table includes a listing of RFID tag identifiers and whether the identifier indicates opening or no opening.

The process then passes to block 910 which illustrates a determination of whether or not the RFID identifier identifies that a package has been opened. If the RFID identifier indicates that no opening has occurred, the process passes back to block 902. If the RFID identifier indicates that a package has been opened, the process passes to block 912. Block 912 depicts using the RFID identifier to identify which particular package has been opened. The process then terminates as depicted by block 914.

Figure 10:
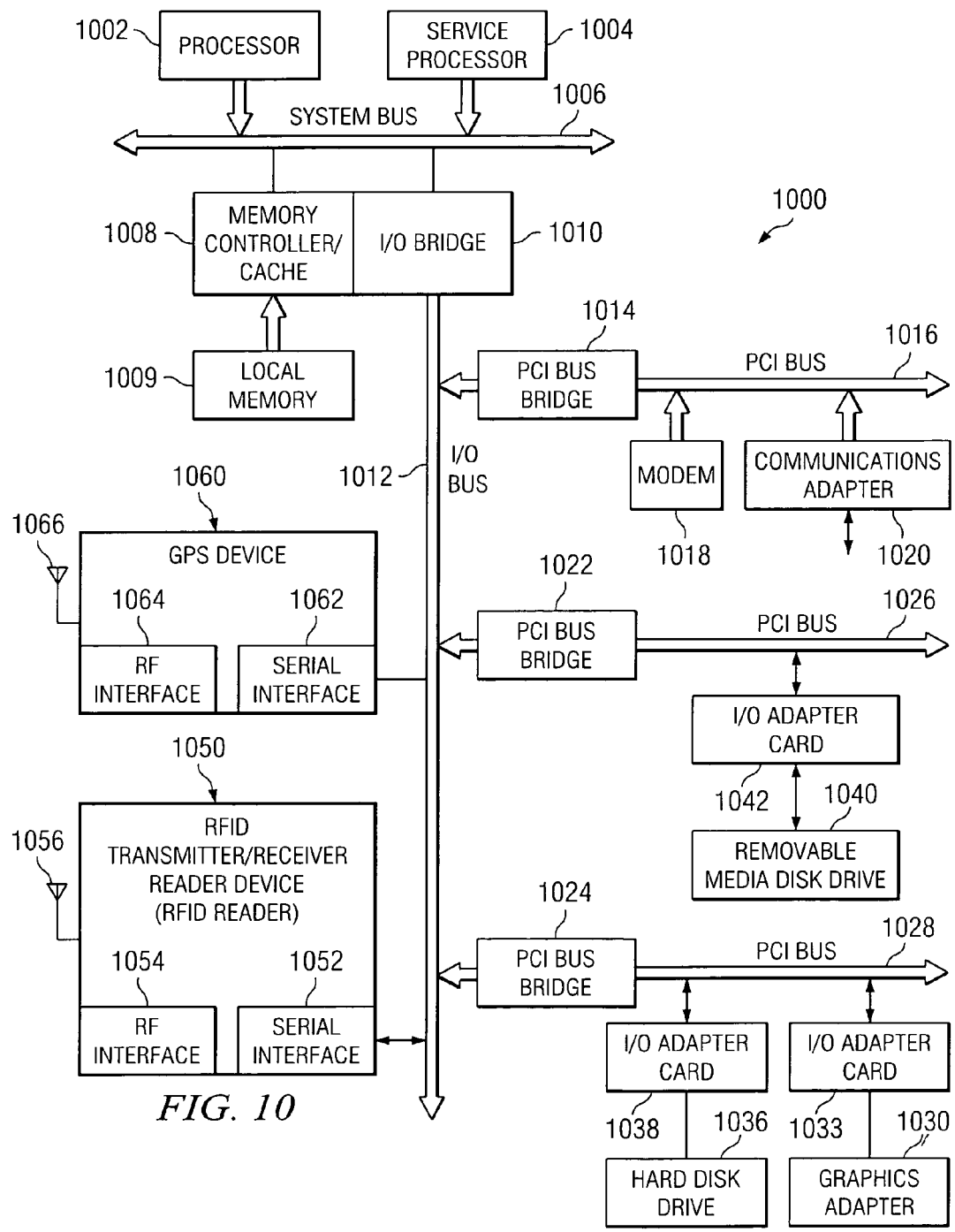
FIG. 10 is a block diagram of a computer system that includes the illustrative embodiment of the present invention.

FIG. 10 is a block diagram of a computer system that includes the illustrative embodiment of the present invention. Computer system 1000 can be used as the RFID reader, or may include an RFID reader, such as RFID reader 1050.

Computer system 1000 may be a symmetric multiprocessor (SMP) system including a plurality of processors 1002 and 1004 connected to system bus 1006. Alternatively, a single processor system may be employed. In the depicted example, processor 1004 is a service processor. Also connected to system bus 1006 is memory controller/cache 1008, which provides an interface to local memory 1009. I/O bus bridge 1010 is connected to system bus 1006 and provides an interface to I/O bus 1012. Memory controller/cache 1008 and I/O bus bridge 1010 may be integrated as depicted.

Peripheral component interconnect (PCI) bus bridge 1014 connected to I/O bus 1012 provides an interface to PCI local bus 1016. A number of modems may be connected to PCI bus 1016. Typical PCI bus implementations will support four PCI expansion slots or add-in connectors. Communications links to other computers may be provided through modem 1018 and communications adapter 1020 connected to PCI local bus 1016 through add-in boards.

Additional PCI bus bridges 1022 and 1024 provide interfaces for additional PCI buses 1026 and 1028, from which additional modems or network adapters may be supported. In this manner, data processing system 900 allows connections to multiple network computers.

A memory-mapped graphics adapter 1030 is connected to PCI bus 1028 through I/O adapter card 1033.

A storage device, such as hard disk drive 1036 is coupled to a PCI bus, such as bus 1028, via an I/O adapter card 1038. Hard disk drive 1036 may be implemented using any type of technology.

Another storage drive 1040, such as a storage drive that receives removable media, is included in system 1000. Storage drive 1040 is coupled to PCI bus 1026 via an I/O adapter card 1042. Digital media drive 1040 may be utilized to read, i.e. play, data that is stored on digital storage removable media, such as a CD-ROM, DVD-ROM, floppy disk, or other removable media, when that digital storage media is inserted into digital media drive 1040. Other types of digital storage media may be utilized in digital media drive 1040 to play the data that is stored in the digital storage media.

Computer system 1000 includes an RFID transmitter/receiver reader device 1050. RFID reader 1050 includes a serial interface 1052 for coupling RFID reader 1050 to I/O bus 1012 so that RFID reader 1050 can communicate with I/O bus 1012. RFID reader 1050 also includes a radio frequency (RF) interface 1054 to which an antenna 1056 is coupled. RF interface 1054 receives and transmits radio frequency signals utilizing antenna 1056.

RFID reader 1050 is capable of transmitting RFID interrogation signals and receiving and processing reply signals from RFID tags.

Computer system 1000 also includes a global positioning system (GPS) device 1060. GPS device 1060 includes a serial interface 1062 for coupling GPS device 1060 to I/O bus 1012 so that GPS device 1060 can communicate with I/O bus 1012. GPS device 1060 also includes a radio frequency (RF) interface 1064 to which an antenna 1066 is coupled. RF interface 1064 receives and transmits radio frequency signals utilizing antenna 1066.

The illustrative embodiment of the present invention can be used to detect tampering with packaging. For example, the illustrative embodiment of the present invention can be used to determine whether a package has been opened while the package is still in a retail store.

The illustrative embodiment of the present invention can also be used to monitor foil packages, such as would hold medications. When the foil package is torn open, the monitoring device would indicate the event of opening the foil packaging. In this manner, a hospital system could determine when and where the event took place.

Those of ordinary skill in the art will appreciate that the hardware depicted in FIG. 10 may vary. For example, other peripheral devices, such as optical disk drives and the like, also may be used in addition to or in place of the hardware depicted. The depicted example is not meant to imply architectural limitations with respect to the preferred embodiment.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the preferred embodiment has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for detecting whether a package has been opened, said method comprising:
    installing a first radio frequency identification (RFID) tag in said package;
    including a first removable disabler wire in said first RFID tag;
    modifying, utilizing said first removable disabler wire, power to said first RFID tag in response to said package being opened after said first RFID tag is installed;
    indicating, utilizing said first RFID tag, a first alert in response to said power being modified;
    said first radio frequency identification (RFID) tag including a first back, said first back including a first removable tear-away portion and a first remaining back portion;
    securing said first tear-away portion only to a first surface of said package;
    securing said first remaining back portion only to a second surface of said package;
    securing said first removable disabler wire to said first tear-away portion;
    removing said first tear-away portion and said first removable disabler wire from said first back in response to said package being opened, wherein said first remaining back portion remains secured to said second surface after said package has been opened;
    modifying said power in response to said first tear-away portion and said first removable disabler wire being removed;
    installing a second radio frequency identification (RFID) tag in said package;
    including a second removable enabler wire in said second RFID tag;
    using said second removable enabler wire to modify power to said second RFID tag in response to said package being opened after said second RFID tag is installed;
    indicating, utilizing said second RFID tag, a second alert in response to power to said second RFID tag being modified;
    said second radio frequency identification (RFID) tag including a second back, said second back including a second removable tear-away portion and a second remaining back portion;
    securing said second tear-away portion to said first tear-away portion;
    securing said second remaining back portion to said first remaining back portion;
    securing said second removable enabler wire to said second tear-away portion;
    removing said first tear-away portion from said first back and said second tear-away portion from said second back in response to said package being opened;
    modifying power to said first RFID tag in response to said first tear-away portion and said first removable disabler wire being removed; and
    modifying power to said second RFID tag in response to said second tear-away portion and said second removable enabler wire being removed.

2. The method according to claim 1, further comprising:
    uniquely identifying said first RFID tag utilizing a unique first RFID identifier;
    preventing said first RFID tag from transmitting said first RFID identifier prior to said power being modified; and
    transmitting, by said first RFID tag, said first RFID identifier in response to said first removable disabler wire being removed from said RFID tag.

3. The method according to claim 1, further comprising:
    uniquely identifying said first RFID tag utilizing a unique first RFID identifier;
    uniquely identifying said second RFID tag utilizing a second unique RFID identifier;
    transmitting, by said first RFID tag, said first RFID identifier prior to said power being modified to said first RFID tag;
    preventing said second RFID tag from transmitting said second RFID identifier prior to said power being modified to said second RFID tag;

preventing said first RFID tag from transmitting said first RFID identifier in response to said power being modified to said second RFID tag; and transmitting, by said second RFID tag, said second RFID identifier in response to said power being modified to said second RFID tag.

4. The method according to claim 1, further comprising:

said first RFID tag including a first microchip that includes logic of said first RFID tag;

uniquely indentifying said first RFID tag utilizing a unique first RFID identifier;

preventing said first microchip from receiving power utilizing said first removable disabler wire, wherein said first removable disabler wire is a tear-away wire that causes a short circuit around said microchip when said first removable disabler wire is present, and wherein said first removable disabler wire is present prior to said package being opened, said first RFID tag being unable to transmit said first RFID identifier while said first removable disabler wire is present;

said second RFID tag including a second microchip that includes logic of said second RFID tag;

uniquely identifying said second RFID tag utilizing a second unique RFID identifier;

connecting said second microchip to power utilizing said second removable enabler wire that is included in said second RFID tag, wherein said second removable enabler wire is a tear-away wire that connects said second microchip to power when said second removable enabler wire is present, and wherein said second removable enabler wire is present prior to said package being opened, said second RFID tag transmitting said second RFID identifier while said second removable enabler wire is present; and tearing said second tear-away portion away from said second RFID tag in response to said package being opened, said second RFID tag ceasing to transmit said second RFID identifier in response to said package being opened.

* * * * *